(12) United States Patent
Kim et al.

(10) Patent No.: US 7,611,802 B2
(45) Date of Patent: Nov. 3, 2009

(54) LITHIUM SECONDARY BATTERY CONTAINING SILICON-BASED OR TIN-BASED ANODE ACTIVE MATERIAL

(75) Inventors: Young-Min Kim, Daejeon (KR); Eun-Suok Oh, Daejeon (KR); Juhyun Kim, Daejeon (KR); Minjung Ryu, Seoul (KR)

(73) Assignee: LG Chem, Ltd. (KR)

( * ) Notice: Subject to any disclaimer, the term of this patent is extended or adjusted under 35 U.S.C. 154(b) by 346 days.

(21) Appl. No.: 11/396,762

(22) Filed: Apr. 3, 2006

(65) Prior Publication Data

US 2006/0286455 A1    Dec. 21, 2006

Related U.S. Application Data

(60) Provisional application No. 60/667,990, filed on Apr. 4, 2005.

(51) Int. Cl.
*H01M 4/58* (2006.01)
*H01M 4/62* (2006.01)

(52) U.S. Cl. .................. 429/218.1; 429/217

(58) Field of Classification Search ............. 429/218.1, 429/217
See application file for complete search history.

(56) References Cited

U.S. PATENT DOCUMENTS

| | | | | |
|---|---|---|---|---|
| 5,219,680 A | * | 6/1993 | Fauteux | 429/306 |
| 5,846,674 A | * | 12/1998 | Sakai et al. | 429/337 |
| 7,462,420 B2 | * | 12/2008 | Oosawa et al. | 429/217 |
| 2004/0043296 A1 | * | 3/2004 | Lithium et al. | 429/306 |
| 2005/0244711 A1 | * | 11/2005 | Fukui et al. | 429/217 |

FOREIGN PATENT DOCUMENTS

| | | |
|---|---|---|
| JP | 10-162832 | 6/1998 |
| JP | 2005-044681 | 2/2005 |
| WO | WO 2005/011030 A1 | 2/2005 |

\* cited by examiner

*Primary Examiner*—Patrick Ryan
*Assistant Examiner*—Thomas H. Parsons
(74) *Attorney, Agent, or Firm*—Cantor Colburn LLP

(57) ABSTRACT

Provided is a lithium secondary battery comprising an anode mix including a silicon- or tin-based material as an anode active material, and as a binder, a photo-polymerizable material composed of one or more monomers selected from the group consisting of an epoxy derivative, polyester acrylate and epoxy acrylate, or oligomers or polymers thereof, wherein an anode can be prepared within a short period of time via a simplified manufacturing process by applying the anode mix to a current collector and polymerizing the applied anode mix with light-irradiation, and further, superior charge/discharge cycle characteristics of the battery are provided due to stable maintenance of binding between active materials and between the active material and current collector, regardless of significant volume changes of the anode active material occurring upon charging/discharging the battery.

7 Claims, No Drawings

LITHIUM SECONDARY BATTERY CONTAINING SILICON-BASED OR TIN-BASED ANODE ACTIVE MATERIAL This application claims the benefit of the filing date of U.S. Provisional Application No. 60/667,990, filed on Apr. 4, 2005, the disclosure of which is incorporated herein in its entirety by reference.

FIELD OF THE INVENTION

The present invention relates to a lithium secondary battery containing a silicon- or tin-based anode active material. More specifically, the present invention relates to a lithium secondary battery comprising an anode mix including a silicon- or tin-based active material as an anode active material, and as a binder, a photo-polymerizable material composed of one or more monomers selected from the group consisting of an epoxy derivative, polyester acrylate and epoxy acrylate, or oligomers or polymers thereof, whereby an anode can be prepared within a short period of time via a simplified manufacturing process by applying the anode mix to a current collector and polymerizing the applied anode mix with light-irradiation, and further, superior charge/discharge cycle characteristics of the battery are provided due to stable maintenance of binding between active materials and between the active material and current collector, regardless of significant volume changes of the anode active material occurring upon charging/discharging the battery.

BACKGROUND OF THE INVENTION

Technological development and increased demand for mobile equipment have lead to a rapid increase in the demand for secondary batteries as an energy source. Among these secondary batteries, a great deal of research and study has been focused on a lithium secondary battery having high energy density and discharge voltage and thus some of such lithium secondary batteries are commercially available and widely used. The lithium secondary battery generally uses a lithium transition metal oxide as a cathode active material and a carbonaceous material as an anode active material.

However, the anode based on the carbonaceous material has a maximum theoretical capacity of only 372 mAh/g (844 mAh/cc), thus suffering from limited increase of capacity thereof. Lithium metals, studied for use as the anode material, have a high energy density and thus may realize high capacity, but raise problems associated with safety concerns due to growth of dendrites and a shortened charge/discharge cycle life as the battery is repeatedly charged/discharged.

For these disadvantages and problems, a number of studies and suggestions have been proposed as to silicon, tin or alloys thereof, as a possible candidate material exhibiting high capacity and being capable of substituting for the lithium metal. For example, silicon (Si) reversibly absorbs (intercalates) and desorbs (deintercalates) lithium ions through the reaction between silicon and lithium, and has a maximum theoretical capacity of about 4200 mAh/g (9366 mAh/cc, a specific gravity of 2.23) that is substantially greater than the carbonaceous materials and thereby is promising as a high-capacity anode material.

However, upon performing charge/discharge processes, silicon, tin or alloys thereof react with lithium, thus undergoing significant changes of volume, i.e., ranging from 200 to 300%, and therefore continuous charge/discharge may result in separation of the anode active material from the current collector, or significant physicochemical changes in contact interfaces between anode active materials, which is accompanied by increased resistance. Therefore, as charge/discharge cycles are repeated, the battery capacity sharply drops, thus suffering from a shortened cycle life thereof. For these reasons, when the binder for a carbon-based anode active material, without any special treatment or processing, is directly applied to a silicon-based anode active material, it is impossible to achieve desired effects.

In order to cope with such problems, a certain prior art has proposed a method for inhibiting lowering of binding force between the current collector and anode active material and/or between anode active materials, resulting from volume changes of the silicon-based anode active material, which uses polyamide acid as a binder and involves applying an anode mix including polyamide acid as the binder to the current collector and heat-treating the applied anode mix at a high temperature (higher than 300° C.), thereby converting polyamide acid into polyimide via imidation. However, this method requires heat-treatment at a high temperature for a prolonged period of time (for example, 10 hours) and thus presents problems associated with remarkably lowered productivity of the battery.

With respect to such problems, the present invention suggests a technique using a material having photo-polymerizable properties as the binder. Utilization of a photo-polymerizable material for fabricating electrodes in secondary batteries is known in some of secondary batteries employing polymer electrolytes.

For example, Japanese Patent Laid-open Publication No. Hei 10-162832 discloses a technique of manufacturing a cathode or anode via photo-polymerization, using a monomer having polymerizable functional groups at ends of the molecular chain and containing a fluoro-alkyl group in the molecular structure thereof, as a binder.

In addition, Japanese Patent Laid-open Publication No. 2005-44681 discloses a technique of manufacturing a cathode or anode via photo-polymerization or thermal polymerization, using an urethane (meth)acrylate-based compound (A) having (meth)acryloyl groups at ends of the molecular chain thereof and/or a polyisocyanate-based derivative (B) where at least one of the molecular chain ends is a (meth)acryloyl group and the remainder is a hydrocarbon group, as a binder.

Such binders adopted in the above-mentioned Japanese Patents are binders for fabricating the cathode or anode in a lithium secondary battery which is primarily based on a polymer electrolyte and may offer superior cycle characteristics to conventional fluorine-based polymers such as polyvinylidene fluoride (PVDF). However, it was confirmed that these binders did not provide a desired level of cycle characteristics in secondary batteries using silicon- or tin-based anode active materials undergoing much further volume changes during a charge/discharge process, as compared to carbon-based anode active materials.

As such, there is an urgent need for the development of battery manufacturing technology which provides strong binding force sufficient to inhibit significant volume changes of anode active materials occurring during a charge/discharge process in lithium secondary batteries using silicon- or tin-based anode active materials and is also economical in terms of a manufacturing process.

Therefore, the present invention has been made to solve the above problems and other technical problems that have yet to be resolved.

As a result of a variety of extensive and intensive studies and experiments to solve the problems as described above, the inventors of the present invention have surprisingly discovered that, in a lithium secondary battery using silicon- or tin-based anode active materials, use of a certain photo-polymerizable material as a binder for an anode mix leads to significantly improved charge/discharge characteristics of the battery via a low increase of resistance resulting from less occurrence of interfacial changes between active materials, in spite of significant volume changes in the anode active material occurring upon charging/discharging the battery, and high binding force between active material and current collector, thus inhibiting easy separation therebetween. The present invention has been completed based on these findings.

SUMMARY OF THE INVENTION

In accordance with an aspect of the present invention, the above and other objects can be accomplished by the provision of a lithium secondary battery comprising an anode mix including a silicon- or tin-based active material as an anode active material and a photo-polymerizable material as a binder, wherein the anode mix including the silicon- or tin-based anode active material and the photo-polymerizable material composed of one or more monomers selected from the group consisting of an epoxy derivative, polyester acrylate and epoxy acrylate, or oligomers or polymers thereof is applied to a current collector, and the thus-applied anode mix is polymerized with light irradiation to secure binding force between the anode active materials and between the anode active material and current collector.

Therefore, the lithium secondary battery in accordance with the present invention utilizes a certain photo-polymerizable material as a binder, and imparts superior charge/discharge cycle characteristics by polymerizing the photo-polymerizable material with light irradiation to enhance binding force between the silicon- or tin-based anode active materials undergoing significant volume changes upon charging/discharging the battery and/or binding force between the anode active material and current collector. Further, the present invention is also advantageous in that, due to adoption of light-induced polymerization, it is possible to carry out the manufacturing process within a short period of time under mild conditions, not severe conditions.

The term "silicon- or tin-based anode active material" is intended to encompass silicon particles, tin particles, silicon-tin alloy particles, silicon alloy particles, tin alloy particles, complexes thereof and the like. Representative examples of the silicon alloys include, but are not limited to, solid solutions, intermetallic compounds and eutectic alloys of Al—Si, Mn—Si, Fe—Si and Ti—Si. As one preferred example of the complex, a silicon/carbon complex may be used and is found in PCT Publication No. WO 2005/011030, assigned to the present applicant, the disclosures of which are incorporated by reference herein in their entirety.

The photo-polymerizable material utilized in the present invention is a material whose polymerization is induced by light, and may include, as defined above, monomers selected from the group consisting of an epoxy derivative, polyester acrylate and epoxy acrylate, and oligomers or polymers thereof. If necessary, a mixture of two or more materials may be used as the photo-polymerizable material.

A representative example of the epoxy derivative may include bisphenol A, and representative examples of the epoxy acrylate may include, but are not limited to, bisphenol A epoxy diacrylate, difunctional bisphenol epoxy acrylate and novolac epoxy acrylate. If necessary, the photo-polymerizable material may be diluted with a glycol acrylate compound such as tripropylene glycol diacrylate prior to use thereof, or may be used in conjunction with a polyol acrylate compound such as 1,6-hexanediol diacrylate.

The oligomer is a polymerization product of about 2 to 25 monomers and may be formed into a polymer having a higher degree of polymerization by application of light irradiation. The polymer may be, for example a linear polymer, a cross-linked polymer or the like, having a low degree of polymerization or low viscosity, and refers to a high-molecular weight material that can undergo chain-extension, cross-linking or the like by photo-polymerization. Therefore, polymerization as used herein refers to a reaction that can produce binding force between active materials and/or between the active material and current collector, by solidification of the materials concerned, and is a concept covering both polymerization and cross-linking.

The photo-polymerizable material may be included in a range of about 1 to 50% by weight, preferably 2 to 30% by weight, based on the total weight of the anode mix. If the content of the photo-polymerizable material is too low, it is difficult to achieve desired addition effects. Conversely, if the content of the photo-polymerizable material is too high, this undesirably leads to increased resistance within the anode, thereby deteriorating characteristics of the battery.

Preferably, the anode mix may further include a photoinitiator as a catalyst. The photoinitiator than can be used in the present invention may be a radical photoinitiator producing radicals and a cationic photoinitiator producing cations. Examples of the radical photoinitiator may include, but are not limited to, dialkoxyacetophenone, benzilketal, hydroxyalkylphenyl ketone, benzoyl oxime ester and amino ketone. Examples of the cationic photoinitiator may include, but are not limited to, onium salts, typically dialkyliodonium salt and triarylsulfonium salt. Specifically, the photoinitiator may be mixed triaryl sulfonium hexafluoroantimonate salts, or a mixture of 1-hydroxy cyclohexyl phenyl ketone and benzophenone.

The photoinitiators may be used alone or may be used in any combination thereof. In order to further enhance efficiency, a photosensitizer may be additionally used. The photosensitizer may include, but is not limited to, thioxanthone and amine.

As a light source used to decompose the photoinitiator, mention may be made of UV light, visible light, electron beam, X-ray, gamma-ray and laser beam.

In addition to the silicon- or tin-based anode active material, photo-polymerizable material and photoinitiator as mentioned hereinbefore, the anode mix may further include additional components such as a viscosity adjuster, a conductive material and a filler, which are used alone or in any combination thereof.

The viscosity adjuster is a component adjusting the viscosity of the anode mix such that a mixing process of the anode mix and an application process of the anode mix to the current collector can be easily carried out. The viscosity adjuster may be added in an amount of 0 to 30% by weight, based on the total weight of the anode mix. Examples of the viscosity adjuster may include, but are not limited to, carboxymethyl cellulose and polyvinyl alcohol. Alternatively, in order to adjust viscosity of the anode mix, a solvent such as N-methylpyrrolidone (NMP) may be used in an amount of 0 to 30% by weight, based on the total weight of the anode mix. In this case, such a solvent is dried before or after polymerization or curing, thereby preparing an electrode.

The conductive material is a component used to improve conductivity of the anode active material and may be added in an amount of 1 to 50% by weight, based on the total weight of the anode mix. There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The filler is an optional ingredient used to inhibit anode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

The secondary battery in accordance with the present invention is fabricated by applying the anode mix to the current collector, followed by rolling, drying and curing.

The anode current collector is generally fabricated to have a thickness of 3 to 500 µm. There is no particular limit to the anode current collector, so long as it has suitable conductivity without causing chemical changes in the fabricated battery. As examples of the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be fabricated to form fine irregularities on the surface thereof so as to enhance adhesiveness to the anode active material. In addition, the anode current collector may take various forms including films, sheets, foils, nets, porous structures, foams and non-woven fabrics.

Hereinafter, the other remaining components necessary for the lithium secondary battery in accordance with the present invention will be described.

The lithium secondary battery is comprised of an anode fabricated as described above, a cathode, a separator and a non-aqueous electrolyte containing a lithium salt.

The cathode is, for example, fabricated by applying a mixture of the cathode active material, a conductive material and a binder to a cathode current collector, followed by drying. If desired, a filler may be further added to the above mixture.

Examples of the cathode active material that can be used in the present invention may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ ($0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithium nickel oxides of Formula $LiNi_{1-x}M_xO_2$ (M=Co, Mn, Al, Cu, Fe, Mg, B or Ga, and $0.01 \leq x \leq 0.3$); lithium manganese composite oxides of Formula $LiMn_{2-x}M_xO_2$ (M=Co, Ni, Fe, Cr, Zn or Ta, and $0.01 \leq x \leq 0.1$), or Formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$.

The cathode current collector is generally fabricated to have a thickness of 3 to 500 µm. There is no particular limit to the cathode current collector, so long as it has high conductivity without causing chemical changes in the fabricated battery. As examples of the cathode current collector, mention may be made of stainless steel, aluminum, nickel, titanium, sintered carbon and aluminum or stainless steel which was surface-treated with carbon, nickel, titanium or silver. The current collector may be fabricated to have fine irregularities on the surface thereof so as to enhance adhesiveness to the cathode active material. In addition, the current collector may take various forms including films, sheets, foils, nets, porous structures, foams and non-woven fabrics.

The binder for the cathode active material is a component assisting in binding between the active material and conductive material, and in binding with the current collector. The binder utilized in the present invention is typically added in an amount of 1 to 50% by weight, based on the total weight of the cathode mix. As examples of the binder, mention may be made of polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

Details of other conductive material and filler were the same as in the anode.

The separator is interposed between the cathode and anode. As the separator, an insulating thin film having high ion permeability and mechanical strength is used. The separator typically has a pore diameter of 0.01 to 10 µm and a thickness of 5 to 300 µm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The non-aqueous electrolyte containing a lithium salt is composed of a non-aqueous organic solvent and lithium salt.

As the organic solvent that can be used in the present invention, for example, mention may be made of non-protic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

The lithium salt is a material that is readily soluble in the above-mentioned non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

EXAMPLES

Now, the present invention will be described in more detail with reference to the following examples. These examples are provided only for illustrating the present invention and should not be construed as limiting the scope and spirit of the present invention.

Examples 1 through 6

A silicon-carbonaceous material complex (Si—C) as an anode active material, a mixture of a photo-curable monomer or oligomer and a photoinitiator, as given in Table 1 below, as a binder, and 2% by weight of carbon black powder as a conductive material were mixed to thereby prepare an anode mix. Then, 100 parts by weight of N-methyl pyrrolidone (NMP) as a solvent were added relative to 100 parts by weight of the anode mix. The resulting mixture was stirred for about 30 min to prepare a slurry for an anode. The slurry thus obtained was applied in a thickness of about 90 μm to copper (Cu) foil having a thickness of 18 μm and was light-cured in a UV curing equipment at a light dose of 10 J/cm$^2$, and thereafter the solvent was heat-dried at a temperature of 130° C. for 1 hour to prepare an anode.

A lithium cobalt oxide as a cathode active material, polyvinylidene fluoride (PVDF) as a binder and 3% by weight of carbon black powder as a conductive material were mixed to thereby prepare a cathode mix. Then, 200 parts by weight of NMP were added relative to 100 parts by weight of the cathode mix. The resulting mixture was stirred for about 30 min to prepare a slurry for a cathode. The slurry thus obtained was applied in a thickness of about 90 μm to aluminum (Al) foil having a thickness of 18 μm and thereafter the solvent was heat-dried at a temperature of 130° C. for 1 hour to prepare a cathode.

A porous film made of polypropylene was interposed between the anode and cathode thus prepared as above, and an EC:EMC (1:2) electrolyte containing 1M LiPF$_6$ was added thereto to prepare a coin cell.

Comparative Example 1

A coin cell was prepared in the same manner as in Example 1, except that an anode was fabricated using a mixture of urethane (meth)acrylate, prepared using isophorone diisocyanate, polyethylene glycol and hydroxy ethyl acrylate, and methoxy polyethylene glycol monoacrylate in a weight ratio of 4:1, as a binder, and 1-hydroxy cyclohexyl phenyl ketone as a photoinitiator.

Comparative Example 2

A coin cell was prepared in the same manner as in Example 1, except that an anode was fabricated using an acrylate compound having the following structure as a binder.

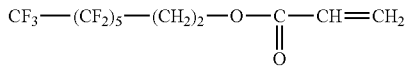

Experimental Example 1

In order to evaluate cell performance, for the respective coin cells prepared in Examples 1 through 6 and Comparative Examples 1 and 2, changes in charge/discharge characteristics of cells were tested using a charge/discharge measuring apparatus. That is, for the respective coin cells, 2 cycles of charge/discharge at 0.1 C rate and 50 cycles of charge/discharge at 0.5 C rate were respectively repeated at a temperature of 23° C., using a constant-current/constant-voltage method. A capacity retention rate (%) at 50$^{th}$ cycle versus initial capacity for the corresponding coin cells is shown in Table 1 below. Evaluation was made using more than 5 coin cells for Examples 1 through 6 and Comparative Examples 1 and 2, respectively, and was expressed as a mean value.

TABLE 1

|  | Photo-polymerizable material (wt %) | Content of anode active material (wt %) | Photoinitiator (wt %) | 50-Cycle Eff. (%) |
|---|---|---|---|---|
| Example 1 | Bisphenol A (14) | 82 | UVI-6974(2) | 80 |
| Example 2 | Bishenol A (12) + SR238 (4) | 79 | UVI-6974 (2) + Irgacure 500(1) | 82 |
| Example 3 | Ebecryl 600 (18) | 78 | Irgacure 500 (2) | 83 |
| Example 4 | CN2200 (14) | 82 | Irgacure 500 (2) | 82 |
| Example 5 | Ebecryl 3603 (14) | 82 | Irgacure 500 (2) | 84 |
| Example 6 | CN120 (14) | 82 | Irgacure 500 (2) | 81 |
| Comp. Example 1 | As defined above | 82 | As defined above | 65 |
| Comp. Example 2 | As defined above | 82 | Irgacure 500 (2) | 30 |

Ebecryl 600: Bisphenol A epoxy diacrylate (available from Radcure)
Ebecryl 3603: Novolac epoxy acrylate diluted with 20% tripropylene glycol diacrylate (available from Radcure)
CN120: Difunctional bisphenol epoxy acrylate (available from Sartomer)
CN2200: Polyester acrylate oligomer (available from Sartomer)
SR238: 1,6-hexanediol diacrylate (available from Sartomer)
Irgacure 500: Mixture of 50% 1-hydroxy cyclohexyl phenyl ketone and 50% benzophenone (available from Ciba-Geigy)
UVI-6974: Mixed triaryl sulfonium hexafluoroantimonate salts (available from Cyracure)

As can be seen from Table 1, cells of Examples 1 through 6 using the binder in accordance with the present invention exhibited at least more than 80% capacity retention even after 50 charge/discharge cycles, as compared to the initial capacity. This is because significant volume changes of the anode active material, i.e., silicon-carbonaceous material complex (Si—C), occurring upon charging/discharging, are inhibited by strong binding force of the binder in accordance with the present invention and therefore interfacial changes between active materials are also greatly inhibited, thereby leading to less increased resistance, and separation of the active material from the current collector is prevented due to high binding force therebetween. In contrast, it was confirmed that cells of Comparative Examples 1 and 2 exhibited substantially decreased capacity because the binder used therein has failed to withstand such significant volume changes of the anode active material.

INDUSTRIAL APPLICABILITY

As apparent from the above description, a lithium secondary battery in accordance with the present invention can be manufactured into a large-capacity lithium secondary battery via use of a silicon- or tin-based anode active material. Further, the lithium secondary battery of the present invention exhibits superior charge/discharge cycle characteristics by stably maintaining binding force between active materials and between the active material and current collector in spite of significant volume changes in the anode active materials occurring upon charging/discharging the battery, via use of a photo-polymerizable material as a binder of an anode mix, and enables preparation of the anode within a short period of time by a simplified manufacturing process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A lithium secondary battery comprising an anode mix including a silicon- or tin-based active material as an anode active material and a photo-polymerizable material as a binder, wherein the anode mix includes the silicon- or tin-based anode active material, and the photo-polymerizable material is composed of one or more monomers selected from the group consisting of an epoxy derivative, polyester acrylate and epoxy acrylate, or oligomers or polymers in the range of about 1 to 50% by weight, based on the total weight of the anode mix, and a catalytic amount of a photoinitiator,
   wherein the silicon or tin-based anode active material is a silicon-carbonaceous material complex (Si—C); and
   the epoxy derivative is bisphenol A, and the epoxy acrylate is bisphenol A epoxy diacrylate, difunctional bisphenol epoxy acrylate or novolac epoxy acrylate.

2. The battery according to claim 1, wherein the photo-polymerizable material is diluted with a glycol acrylate compound prior to use thereof, or is used with further addition of a polyol acrylate compound.

3. The battery according to claim 1, wherein the photoinitiator is a radical photoinitiator, or a cationic photoinitiator using an onium salt.

4. The battery according to claim 3, wherein the radical photoinitiator is selected from the group consisting of dialkoxyacetophenone, benzilketal, hydroxyalkyiphenyl ketone, benzoyl oxime ester and amino ketone.

5. The battery according to claim 3, wherein the onium salt is a dialkyliodonium salt or a triarylsulfonium salt.

6. The battery according to claim 1, wherein the anode mix further includes one or more additional components selected from the group consisting of a viscosity adjuster, a conductive material and a filler.

7. The battery according to claim 1, wherein the anode current collector has a thickness of 3 to 500 μm and fine irregularities formed on the surface thereof.

* * * * *

UNITED STATES PATENT AND TRADEMARK OFFICE
CERTIFICATE OF CORRECTION

PATENT NO. : 7,611,802 B2 Page 1 of 1
APPLICATION NO. : 11/396762
DATED : November 3, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 560 days.

Signed and Sealed this

Twelfth Day of October, 2010

David J. Kappos
*Director of the United States Patent and Trademark Office*